United States Patent [19]

Brown et al.

[11] Patent Number: 4,464,021

[45] Date of Patent: Aug. 7, 1984

[54] ISOLATOR FOR HIGH POWER RADIATION

[75] Inventors: Clyde O. Brown, Newington; David C. Smith, Glastonbury, both of Conn.

[73] Assignee: United Technologies Corporation, Hartford, Conn.

[21] Appl. No.: 249,757

[22] Filed: Apr. 1, 1981

[51] Int. Cl.³ .................................................. G02B 5/23
[52] U.S. Cl. ..................................... 350/354; 372/703; 372/103
[58] Field of Search ......................... 372/703, 101, 98; 350/354, 319; 376/103, 108; 324/96

[56] References Cited

U.S. PATENT DOCUMENTS 3,735,278 5/1973 Schafer et al. ...................... 372/101
4,019,157 4/1977 Hutchinson et al. .................. 372/20

Primary Examiner—William L. Sikes
Assistant Examiner—Léon Scott, Jr.
Attorney, Agent, or Firm—Eric W. Petraske

[57] ABSTRACT

An isolator device that permits the passage of low-intensity radiation while blocking the passage of high-intensity radiation comprises a spatial filter and a gas cell that utilizes the phenomenon of thermal blooming to deflect high-intensity radiation so that it is blocked by the spatial filter.

5 Claims, 1 Drawing Figure

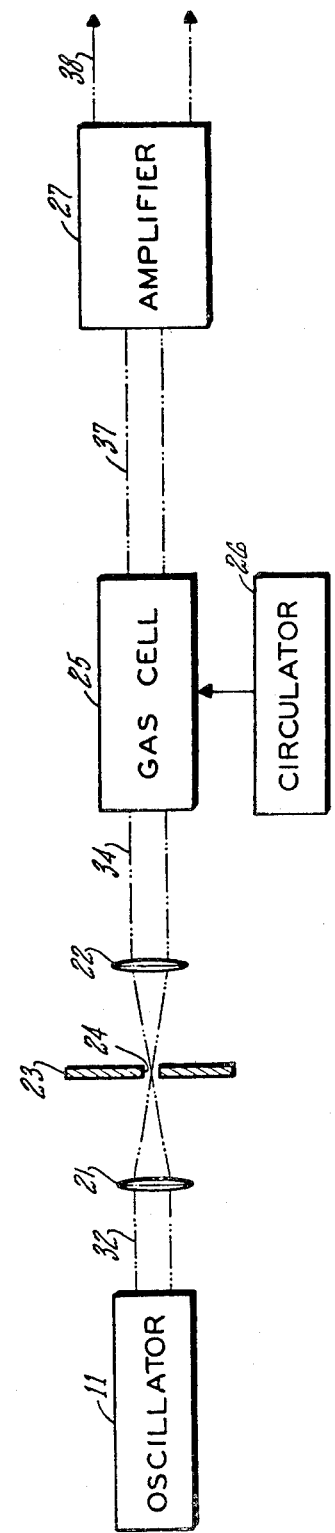

ISOLATOR FOR HIGH POWER RADIATION

DESCRIPTION

1. Technical Field

The technical field of the invention is that of protecting delicate optical components from high power radiation.

2. Background of the Invention

Researchers working in the field of high power lasers and devices dealing with high power radiation have long sought a device that would prevent the passage of high power radiation into subsystems or devices that cannot withstand the damaging effects of such radiation while permitting these moresensitive devices to operate with lower power levels.

One approach to the problem is disclosed in U.S. Pat. No. 4,003,631, in which a semiconductor plate normally transmissive to the radiation permits an output pulse to pass. The plate is electronically rendered opaque in order to prevent radiation reflected back from a target from entering the system.

DISCLOSURE OF INVENTION

The invention relates to a device that permits the passage of low-intensity radiation and blocks the passage of high intensity radiation by means of a medium exhibiting the property of thermal blooming in response to the passage therethrough of high intensity radiation, so that radiation of intensity below a certain threshold passes through an aperture and radiation above the threshold is deflected so that it does not pass the aperture.

BRIEF DESCRIPTION OF DRAWING

FIG. 1 shows an embodiment of the invention.

BEST MODE FOR CARRYING OUT THE INVENTION

In FIG. 1, oscillator 11 generates a stable, high-quality beam 32 that is focused by lens 21 through aperture 24 in plate 23 and then collimated by lens 22 to beam 34. The output radiation then passes through gas cell 25 through windows not shown, which cell may be either closed or part of a system that circulates gas through cell 25. A conventional gas circulation system is indicated schematically as element 26. The particular pump or blower used forms no part of the invention. The radiation 37 then passes into amplifier 27 where it is increased in power in a conventional manner and is then directed out along path 38.

The system described above may be part of a laser welding apparatus, fusion apparatus, a laser radar tracking system or any other of a number of systems in which a high-quality beam is generated at relatively low power and with relatively delicate apparatus and is then amplified in power. The above-described system without a laser oscillator 11 and/or amplifier 27 can also be used to protect delicate optical components such as telescopes or sensitive cameras and electrooptic detectors from external radiation.

In operation, radiation passing cell 25 is partially absorbed so that the gas along the beam path is heated. This heating changes the index of refraction of the gas so that a radiation beam is deflected by an amount that depends on the local heating of the gas and thus on the power of the radiation. The system can be designed so that low-power radiation is substantially unaffected and high power radiation is essentially blocked.

More specifically, in the case of a convection dominated absorption cell the angular detection is given by $$\theta(Z) = \frac{-\mu_T \alpha I Z}{\rho C_p V}$$

where Z is the length of cell 25 extending along the beam direction, $\alpha$ is the absorption coefficient of the gas, I is the intensity of the radiation entering cell 25, $\mu_T$ is the change in index of refraction of the gas per degree Kelvin, $\rho$ is the density of the gas, $C_p$ is the specific heat of the gas, and V is the velocity of the gas in a direction transverse to the radiation beam.

In a particular embodiment, $Z = 30$ cm, $V = 10$ cm/sec, $I = 100$ watts, $\mu_T = 10^{-6}$ °K.$^{-1}$, $\alpha = 1.8 \times 10^{-3}$ cm$^{-1}$, $\rho = 10^{-3}$ gm cm$^{-3}$, $C_p = 1$ j/gm °K. The gas used is a mixture of $CO_2$ and air, or air seeded with propane or other absorbing gas. The medium in cell 25 may also be a liquid, such as carbon disulfide. Oscillator 11 is a 100 watt cw $CO_2$ laser, generating a beam with a 1/e diameter of 1 cm. The diameter of the aperture is taken to be three times the laser beam diameter at the lens 21 focus. The lens focal length is taken to be 10 cm and the focal diameter is $3.4 \times 10^{-3}$ cm (diffraction limit) so the aperture diameter is 0.1 mm. Thus the oscillator beam 32 passes through the aperture with negligible laser power loss.

The foregoing parameters were selected so that the deflection of beam 34 is comparable to the diffraction angle of beam 32, $1.7 \times 10^{-4}$ radians for a laser power of 100 watts. In this case, beam 32 loses 5% of its power by absorption in cell 25 and the loss of power in aperture 24 is negligible.

If radiation is reflected back along path 38 and through amplifier 27, where it also is amplified, a beam having a sizable intensity may impinge on gas cell 25. For example, if the amount of power entering amplifier 27 and the amplifier parameters are such that a beam of 500 watts of unwanted radiation with a 1/e diameter of 1 cm passes through cell 25 toward beam clipping aperture 24, the above parameters result in a deflection angle of $0.85 \times 10^{-3}$ radians, since the angle is proportional to the power passing through cell 25. With the foregoing deflection angle, the only part of the beam that will be transmitted through aperture 24 is that which lies outside the $1/e^2$ radius or approximately 5%; and only 25 watts will impinge on the oscillator. If the unwanted power is greater than 500 watts, then the deflection will be greater and the fraction of unwanted radiation that passes the filter will be even less.

In the case of unwanted radiation that is pulsed, the gas in cell 25 need not flow and the angular deflection will be radially symmetric and given by $$\theta = \frac{8(-\mu_T)C_s^2 E \alpha Z t_p^2}{3 \pi \rho C_p a^5}$$

where $C_s$ is the acoustic velocity in the gas cell, E is the total energy in the pulse of length $t_p$ and the other symbols are defined above. In this case, the angular deflection is a function of time. Using the same laser beam size, gas cell and aperture as in the above example, the pulse energy that can be rejected by the isolator for a 10 $\mu$sec pulse is 210 joules. This is based on an angular deflection of 5 times the diffraction angle at the end of the laser pulse containing 210 joules. Since the transmission is effectively zero at the end of the pulse, a little more than half the energy or ~100 joules will be transmitted. Any higher energy fluence or longer duration pulse will result in a greater rejection.

It should be noted that continuous wave laser radiation can also be rejected by a gas cell with no forced convection. In this case, the angular deflection is a function of the thermal gradients resulting from either thermal conduction or natural convection of the gas and also has a linear dependence on time. However convection cells may offer advantages over static cells because the deflection does not distort the oscillator beam as severely as the static cell spreading. Further, the convection cell gives a predictable beam deflection and the potential for control of the unwanted laser power such as reflecting it into a power dump.

We claim:

1. An optical device comprising:
frequency-insensitive spatial filter means, disposed along an axis, for passing radiation traveling along a path within a predetermined angle of said axis and frequency-insensitive thermal blooming deflection means including a fluid having an index of refraction responsive to the intensity of radiation passing therethrough and being positioned along said axis a predetermined distance from said spatial filter means, for deflecting radiation passing therethrough by a deflection angle the magnitude of which is dependent on the intensity of said deflected radiation, said thermal blooming deflection means being disposed with respect to said spatial filter means such that radiation of intensity less than a predetermined magnitude traveling along said axis is deflected by an angle less than said predetermined angle and radiation of intensity greater than said predetermined magnitude traveling along said axis is deflected by an angle greater than said predetermined angle, whereby radiation of intensity greater than said predetermined magnitude traveling through said thermal blooming deflection means toward said spatial filter means is deflected by an angle greater than said predetermined angle and is therefore blocked.

2. An optical device according to claim 1, further comprising means for flowing said fluid with a predetermined velocity transverse to said axis.

3. An optical device according to any of claims 1 or 2, in which said deflected radiation is continuous wave.

4. An optical device according to any of claims 1 or 2, in which said deflected radiation is pulsed.

5. An optical device according to claim 1, in which said fluid is flowing with a predetermined velocity transverse to said axis.

* * * * *